United States Patent
Pappachan et al.

(10) Patent No.: US 11,126,733 B2
(45) Date of Patent: Sep. 21, 2021

(54) SYSTEM, APPARATUS AND METHOD FOR CONFIGURABLE TRUSTED INPUT/OUTPUT ACCESS FROM AUTHORIZED SOFTWARE

(71) Applicant: Intel Corporation, Santa Clara, CA (US)

(72) Inventors: Pradeep M. Pappachan, Hillsboro, OR (US); Siddhartha Chhabra, Portland, OR (US); Bin Xing, Hillsboro, OR (US); Reshma Lal, Hillsboro, OR (US); Baruch Chaikin, D.N. Misagv (IL)

(73) Assignee: Intel Corporation, Santa Clara, CA (US)

( * ) Notice: Subject to any disclaimer, the term of this patent is extended or adjusted under 35 U.S.C. 154(b) by 166 days.

(21) Appl. No.: 16/113,013

(22) Filed: Aug. 27, 2018

(65) Prior Publication Data
US 2019/0042766 A1 Feb. 7, 2019

(51) Int. Cl.
| G06F 21/00 | (2013.01) |
| G06F 21/60 | (2013.01) |
| G06F 21/62 | (2013.01) |
| H04L 9/08 | (2006.01) |
| H04L 9/32 | (2006.01) |
| G06F 21/53 | (2013.01) |
| G06F 21/57 | (2013.01) |
| G06F 21/82 | (2013.01) |

(52) U.S. Cl.
CPC ............ *G06F 21/602* (2013.01); *G06F 21/53* (2013.01); *G06F 21/575* (2013.01); *G06F 21/606* (2013.01); *G06F 21/6218* (2013.01); *G06F 21/82* (2013.01); *H04L 9/088* (2013.01); *H04L 9/0819* (2013.01); *H04L 9/0894* (2013.01); *H04L 9/3247* (2013.01)

(58) Field of Classification Search
None
See application file for complete search history.

(56) References Cited

U.S. PATENT DOCUMENTS

| 2009/0274300 A1* | 11/2009 | Tou ..................... H04L 63/0428 380/255 |
| 2012/0023546 A1* | 1/2012 | Kartha .................. H04L 63/104 726/1 |
| 2013/0227641 A1* | 8/2013 | White ..................... G06F 21/57 726/1 |
| 2014/0195799 A1* | 7/2014 | Erickson ................. G06F 21/57 713/155 |
| 2016/0179702 A1* | 6/2016 | Chhabra ............. G06F 13/1605 713/193 |
| 2017/0024584 A1* | 1/2017 | Chhabra ................. G06F 21/57 |
| 2017/0364707 A1 | 12/2017 | Lal et al. |
| 2018/0145951 A1 | 5/2018 | Varadarajan et al. |

* cited by examiner

*Primary Examiner* — Andrew J Steinle
(74) *Attorney, Agent, or Firm* — Trop Pruner & Hu, P.C.

(57) ABSTRACT

In one embodiment, an apparatus includes: a memory encryption circuit to encrypt data from a protected device, the data to be stored to a memory; and a filter circuit coupled to the memory encryption circuit, the filter circuit including a plurality of filter entries, each filter entry to store a channel identifier corresponding to a protected device, an access control policy for the protected device, and a session encryption key provided by an enclave, the enclave permitted to access the data according to the access control policy, where the filter circuit is to receive the session encryption key from the enclave in response to validation of the enclave. Other embodiments are described and claimed.

14 Claims, 8 Drawing Sheets

SYSTEM, APPARATUS AND METHOD FOR CONFIGURABLE TRUSTED INPUT/OUTPUT ACCESS FROM AUTHORIZED SOFTWARE

TECHNICAL FIELD

Embodiments relate to security of computing devices, and more particularly to secure data access.

BACKGROUND

Certain devices included in or coupled to a computing system may be used for communication of secure data. To this end, many platforms provide certain mechanisms to protect such devices. However existing solutions to device access control are device-specific. For example, some original equipment manufacturers (OEMs) protect devices such as fingerprint sensors by a dedicated coupling to a secure component in a platform. Data from the device is processed or encrypted inside the secure component. The secure component is in the path of data from device to a software application and determines when to allow data to pass through and when to restrict it. The secure component may encrypt the data before releasing it to authorized software, which is the only entity that has keys to decrypt it. However, this technique does not scale well to different devices on the platform.

DETAILED DESCRIPTION

Figure 1:
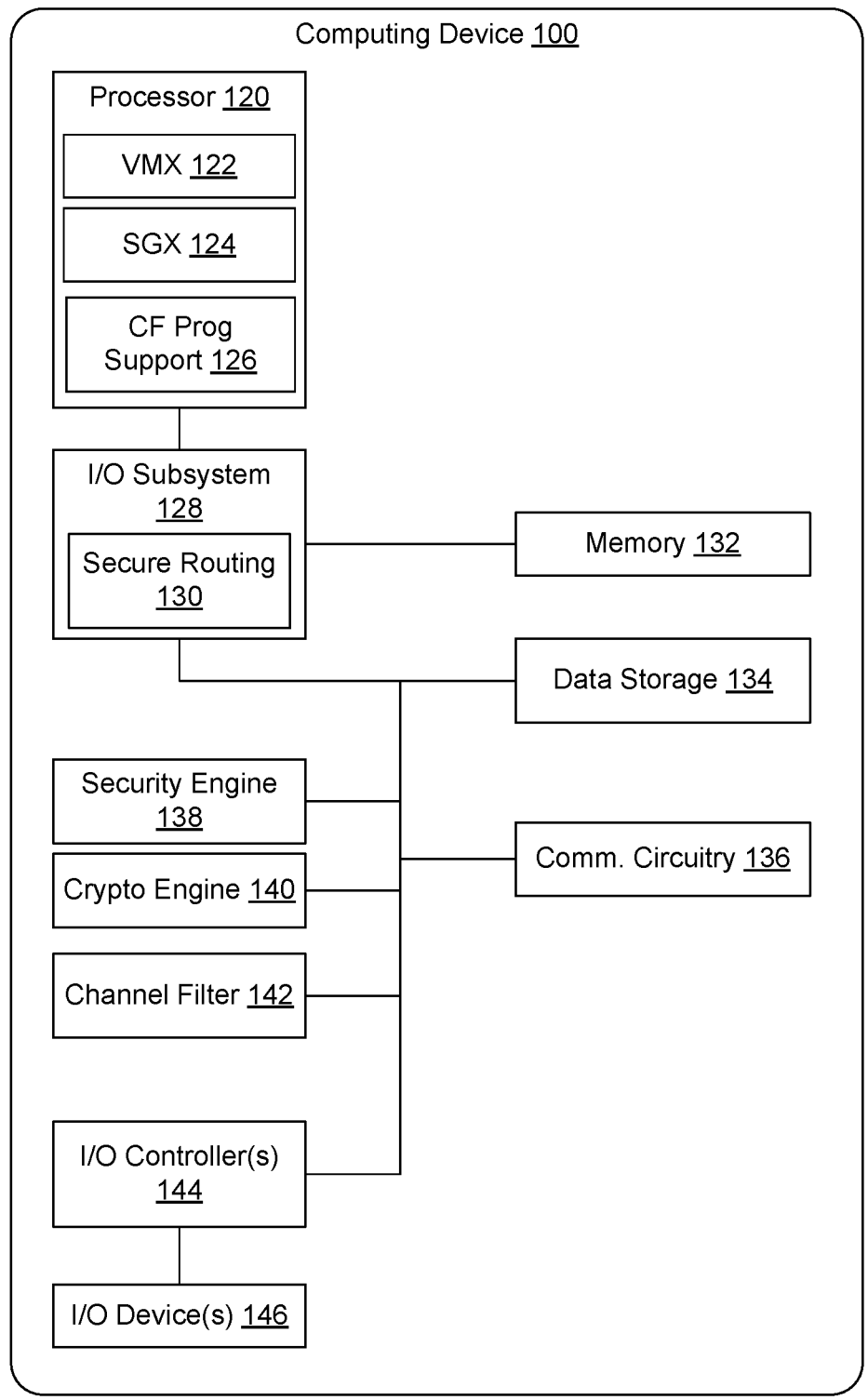
FIG. 1 is a block diagram of an example computer system in accordance with an embodiment of the present invention.

In various embodiments, a trusted input/output (I/O) path between a device and a memory is enabled for access controlled devices, such as biometric sensors, to be used for communication of private data. And embodiments provide platform-level, scalable techniques to control access to any device connected to the platform for many different use cases, with varying throughput and processing needs.

Certain usages of I/O devices dictate that one or more devices be only accessible from authorized software at all times (pre-boot and post-boot). For example, a fingerprint sensor transmits privacy-sensitive user data that is controlled to only be accessible to authorized software that matches a received fingerprint against a reference template. In certain use cases, a platform may be configured to prevent other software from gaining access to the device data. In another example, a system may have a policy that only authorized software can send control commands to a brake system (or other actuator) to ensure vehicle safety.

In order to enforce strict access control for such I/O devices including sensors and actuators, among others, reliance on software alone may be insufficient for usages that involve highly sensitive data. For example, reliance on an operating system (OS) or hypervisor to control access may provide a vulnerability in the system software that can be exploited to bypass the access restriction. Such vulnerability may be an especially real possibility in complex system software with a large code base that offers large attack surfaces. In embodiments, device access control enforced in hardware can offer higher levels of assurance against such threats by eliminating all malware threats.

In embodiments, hardware-based techniques are provided to enforce access control as to data from/to I/O devices, ensuring that only authorized software is able to access them. With access control mechanisms herein only an authorized application is able to access data from such devices, such that when authorized software is not using the device, the data from the device is not accessible to any other software on the platform. Access to the devices can be controlled in pre-boot and post-boot environments, and the access control policy is configurable, such that the policy is not statically built into the hardware during production but is user-configurable (by information technology (IT) personnel, consumer, etc.) to specify which devices are to be protected in this manner.

In embodiments, a platform includes a hardware component called a channel filter (CF), also referred to herein as a "filter circuit" that is in the path of I/O data between memory and I/O devices connected to the platform. The CF can be programmed with unique device identifiers (called channel IDs (CIDs)) and the corresponding access control policies that specify the software identity authorized to access data from those devices. In an embodiment, the device access control policy is a tuple of the form: (CID, hash of authorized enclave identity), where CID is the channel ID for the device that is being protected and the authorized enclave's identity includes the following enclave attributes: MR_SIGNER; PRODUCT_ID; SVN; enclave attributes and miscellaneous features. An enclave is a piece of user-mode software that runs in a reserved region of memory that is encrypted using a key only known to the CPU. Software outside the enclave, including the OS, cannot tamper with the code or data inside the enclave. In this tuple, MR_SIGNER is the cryptographic signature of the author of the enclave. The MR refers to the cryptographic measurement of the code inside the enclave. SVN refers to the Security Version Number of the enclave, used to refer to different versions of the enclave that might have updates to the enclave for functionality or defect fixes.

The CF is responsible for inspecting I/O data in transit to determine if it is coming from/or going to specific I/O devices for which a policy may be programmed. If the data is coming from/or going to a device (identified by CID) for which a policy has been programmed, the CF enforces the policy. If an access is not according to the policy, data may be dropped, and not be allowed to further proceed. For devices that are configured to have access restriction, only authorized software can establish ownership of the device, which is enforced by hardware that controls programming of the CF by a software application.

A secure element such as a security coprocessor has a protected hardware interface to the CF. It is the responsibility of the secure element to program the access control policies into the CF early in the boot process. The original equipment manufacturer (OEM) may define the set of default access control policies that are available on the platform. In an embodiment, a device access control policy includes: device channel ID; identity of software authorized to access the device; I/O transfer direction (input or output). In an embodiment, the OEM provisions signed access control policies into a basic input/output system (BIOS) or other firmware on the platform during manufacturing. The platform owner (e.g., IT personnel) may select the policies to be enforced on the platform. In turn, the BIOS may program the selected policies into the security processor (one-time action) before the OS is loaded.

Early in the boot phase, the secure element on the platform programs the access control policies into the CF. By default, the CF drops I/O data from/to the device for which the policy has been programmed unless authorized software establishes ownership of that device by programming a session encryption key into the CF. In an embodiment, key programming is controlled by a general-purpose processor (e.g., a central processing unit (CPU)), which also enforces that the identity of the software entity requesting key programming matches the identity specified in the policy configured earlier. The authorized software uses special instructions that encode its identity while requesting the CF to grant device access. These instructions compare the identity of the requesting software against the identity included in the access control policy programmed into the CF during boot. If the identity of the software matches that encoded in the policy, the CF allows the software to access the device data, using a session encryption key only known to the authorized software. After the authorized software is done using the device, it may remove the key (give up ownership), which causes the CF to revert to its default behavior of blocking access to the device from all software.

The device access control policy can be provisioned to the platform only by a trusted entity (e.g., OEM). The OEM provisions a set of signed device access control policies for a platform into BIOS. The owner of the platform can configure BIOS to select the set of policies to be enforced on the platform (and which may be a subset of the set of policies). BIOS sends the owner-selected policies to the security processor. In turn, the security processor verifies the authenticity of the policies by verifying the signature on the policies (from the OEM). The security processor protects the policies in a given non-volatile storage with integrity and replay protection.

A trusted execution environment (TEE) is an isolated or protected environment that can protect secrets even when other parts of a system are compromised. Examples of TEEs include Intel™ Software Guard Extensions (Intel™ SGX), secure virtual machines (VMs), and hardware TEEs that may be implemented as a security processor such as a converged security and manageability engine (CSME). While embodiments are described in the context of a particular platform having an SGX TEE and security coprocessor as the security element, understand the scope of the present invention is not limited in this regard.

Referring now to FIG. 1, shown is a block diagram of an example computer system in accordance with an embodiment. As illustrated in FIG. 1, a computing device 100 for secure I/O includes, among other components, a processor 120, main memory 132, a hardware cryptographic engine 140, and one or more I/O controllers 144 in communication with one or more I/O devices 146. In use, cryptographic engine 140 provides on-the-fly encryption and decryption of data transferred via direct memory access (DMA) transactions between I/O controllers 144 and memory 132. Each DMA transaction may be tagged with a CID representing a flow of data associated with a particular I/O device 146 or set of I/O devices 146.

Channel filter 142 is programmed, for example with channel information and associated encryption keys, by trusted software using one or more specialized instructions of the processor 120 to generate wrapped programming information. The trusted software provides the wrapped programming information to untrusted software such as a kernel-mode driver. The untrusted software invokes an unwrapping engine using one or more specialized instructions of the processor 120 to unwrap the programming information and program the channel filter 142. By using specialized processor instructions to wrap the programming information, the computing device 100 may ensure that only trusted software programs the channel filter 142. By allowing untrusted software to invoke the unwrapping engine, the computing device 100 allows system software (e.g., an operating system and/or VMM) to manage programming of the channel filter 142.

The computing device 100 may be embodied as any type of computing system including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 further includes an input/output subsystem 128, a data storage device 134, and communication circuitry 136. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 132, or portions thereof, may be incorporated in the processor 120 in some embodiments.

The processor 120 may be embodied as any type of processor capable of performing the functions described herein, such as a single or multi-core processor(s), digital signal processor, microcontroller, or other processor or hardware circuit. As shown, the processor 120 may include hardware virtualization support 122, secure enclave support 124, and channel filter programming support 126.

The hardware virtualization support 122 supports virtualized execution of operating systems, applications, and other software by the computing device 100. The hardware virtualization support 122 may include virtual machine extensions (VMX) support by providing two modes of execution: VMX-root mode and VMX non-root mode. The VMX-root mode allows executing software to have broad control of the computing device 100 and its hardware resources. A hypervisor, virtual machine monitor (VMM), or host operating system (OS) may execute in VMX-root mode. The VMX non-root mode restricts access to certain hardware instructions while still implementing the ordinary ring/privilege system of the processor 120. One or more guest OSs may execute in the VMX non-root mode. Those guest OSs may execute in ring zero, similar to being executed without virtualization.

The secure enclave support 124 allows the processor 120 to establish a trusted execution environment such as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 132. The secure enclave support 124 may be embodied as a set of processor instruction extensions that allows the processor 120 to establish one or more secure enclaves in the memory 132. For example, the secure enclave support 124 may be embodied as Intel™ SGX technology.

The channel filter programming support 126 allows the processor 120 to program the channel filter 142 to provide cryptographic protection of I/O data. In particular, the processor 120 may enable or disable encryption for certain I/O channels, and may securely provide encryption keys to the channel filter 142 on behalf of secure enclaves. The channel filter programming support 126 may be embodied as one or more specialized processor instructions (e.g., the instructions EBIND, UNWRAP, or other instructions) and associated hardware, microcode, firmware, or other components of the processor 120.

The memory 132 may be embodied as any type of volatile or non-volatile memory or data storage capable of performing the functions described herein. In operation, the memory 132 may store various data and software used during operation of the computing device 100 such as operating systems, applications, programs, libraries, and drivers. The memory 132 is communicatively coupled to the processor 120 via the I/O subsystem 128, which may be embodied as circuitry and/or components to facilitate input/output operations with the processor 120, the memory 132, and other components of the computing device 100. For example, the I/O subsystem 128 may include a secure routing component 130, a fingerprint sensor and other sensors that may measure biometric information that is to be protected using embodiments herein. In some embodiments, the I/O subsystem 128 may form a portion of a system-on-a-chip (SoC) and be incorporated, along with the processor 120, the memory 132, and other components of the computing device 100, on a single integrated circuit.

The data storage device 134 may be embodied as any type of device or devices configured for short-term or long-term storage of data such as, for example, memory devices and circuits, memory cards, hard disk drives, solid-state drives, or other data storage devices. In some embodiments, the data storage device 134 may be used to store the contents of one or more secure enclaves. When stored by the data storage device 134, the contents of the secure enclave may be encrypted to prevent unauthorized access.

The communication circuitry 136 of the computing device 100 may be embodied as any communication circuit, device, or collection thereof, capable of enabling communications between the computing device 100 and other remote devices over a network. The communication circuitry 136 may be configured to use any one or more communication technology (e.g., wired or wireless communications) and associated protocols (e.g., Ethernet, Bluetooth™, Wi-Fi™, WiMAX, etc.) to effect such communication.

In some embodiments, the computing device 100 may include a security engine 138, which may be embodied as any hardware component(s) or circuitry capable of providing security-related services to the computing device 100. In particular, the security engine 138 may include a microprocessor, microcontroller, or other embedded controller capable of executing firmware and/or other code independently and securely from the processor 120. Thus, the security engine 138 may be used to establish a trusted execution environment separate from code executed by the processor 120. The security engine 138 may communicate with the processor 120 and/or other components of the computing device 100 over a dedicated bus. In the illustrative embodiment, the security engine 138 is embodied as a CSME incorporated in an SoC of the computing device 100. In some embodiments, the security engine 138 may be embodied as a manageability engine, an out-of-band processor, a Trusted Platform Module (TPM), or other security engine device or collection of devices. Further, in some embodiments, the security engine 138 is also capable of communicating using the communication circuitry 136 or a dedicated communication circuit independently of the state of the computing device 100 (e.g., independently of the state of the main processor 120), also known as "out-of-band" communication.

The cryptographic engine 140 may be embodied as any microcontroller, microprocessor, functional block, logic, or other circuit or collection of circuits capable of performing the functions described herein. As further described below, the cryptographic engine 140 may encrypt and/or decrypt I/O data read or written by the I/O controllers 144 in one or more DMA operations to the memory 132. The cryptographic engine 140 may, based on information in channel filter 142, dynamically identify DMA channel(s) to be protected. In some embodiments, the cryptographic engine 140 may be incorporated along with the I/O subsystem 128 and/or the processor 120 in a system-on-a-chip (SoC) of the computing device 100. The I/O devices 146 may be embodied as any I/O device, such as human interface devices, keyboards, mice, touch screens, microphones, cameras, and other input devices, as well as displays and other output devices.

Figure 2:
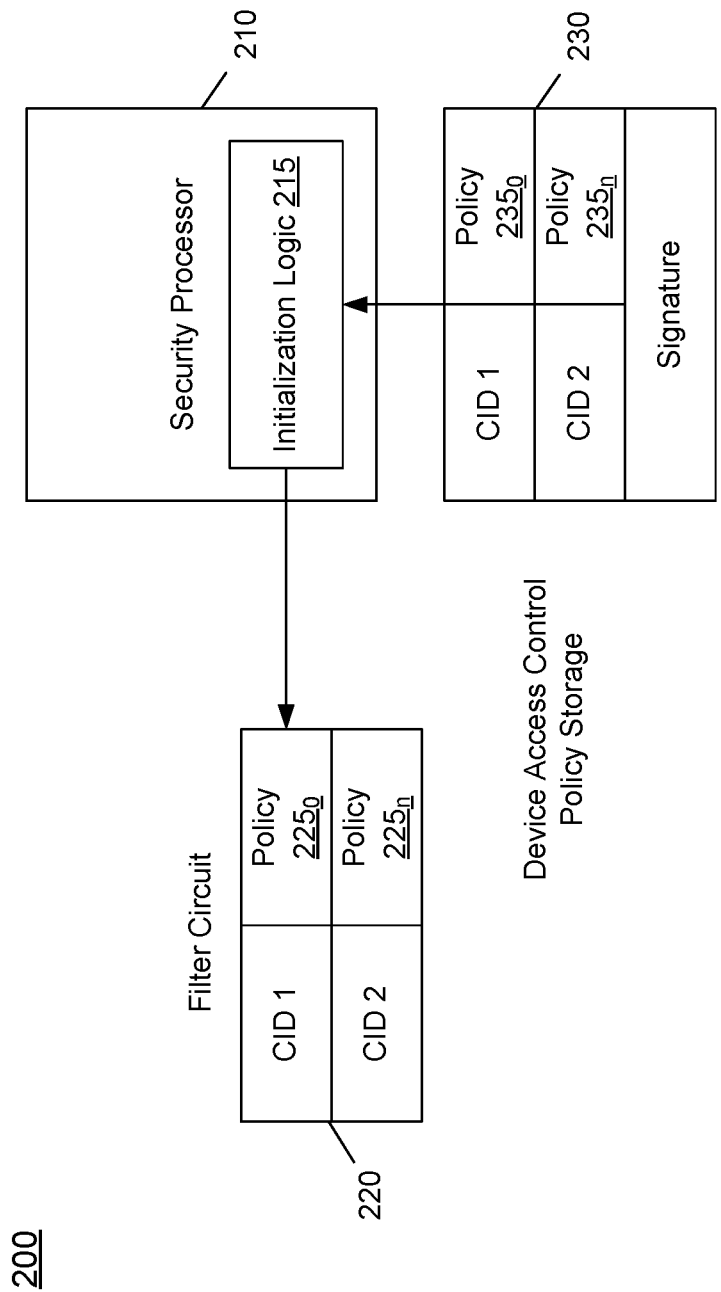
FIG. 2 is a block diagram of a trusted input/output architecture in accordance with one embodiment of the present invention.

Referring now to FIG. 2, shown is a block diagram of a trusted I/O architecture in accordance with an embodiment. As illustrated in FIG. 2, architecture 200 includes a security processor 210, a filter circuit 220, and a device access control policy storage 230, which may be implemented within BIOS.

With this arrangement, initialization logic 215 within security processor 210 may identify one or more device access control policies $235_{0-n}$ to obtain from policy storage 230 and store corresponding entries $225_{0-n}$ within filter circuit 220. Then during normal operation filter circuit 220 may mediate accesses associated with protected devices according to the policies stored within filter circuit 220. Although shown at this high level in the embodiment of FIG. 2, many variations and alternatives are possible. Further note that is possible, based on user configuration, that only a subset of OEM-provided policies 235 within policy storage 230 may be stored in filter circuit 220.

Figure 3:
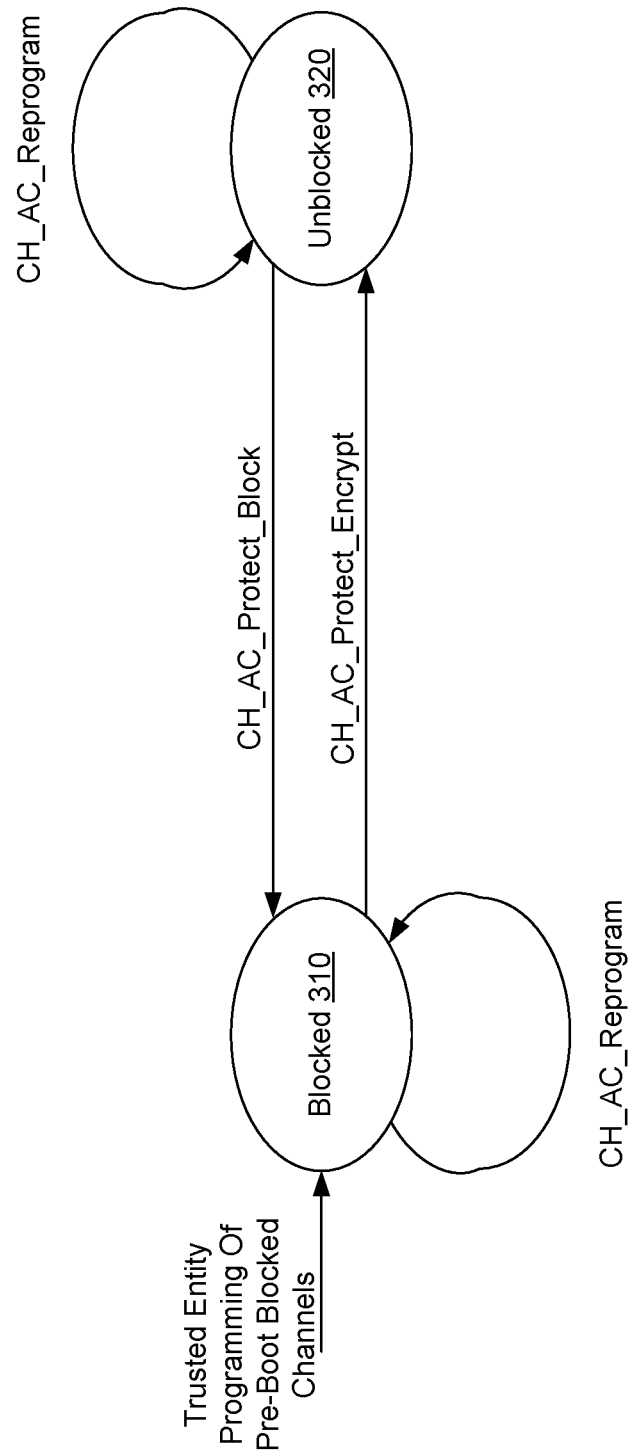
FIG. 3 is a state diagram of a device associated with a device access policy in accordance with one embodiment of the present invention.

Referring now to FIG. 3, shown is a state diagram illustrating multiple states for devices associated with device access control policies. Specifically, as shown in state diagram 300, devices may begin in a blocked state 310 in which no entity is allowed to access data from the device. After appropriate programming as described herein by a trusted entity, a given device subject to an access control policy may be placed into an unblocked state 320, in which one or more authorized entities such as secure enclaves may access data from the devices. Note that FIG. 3 further shows the various control transitions between the various states for a given filter entry (and accordingly associated protected device).

With further reference to FIG. 3, a device starts in blocked state 310 after the security processor programs device access policies to the CID filter hardware. EBIND supports the following commands to allow an enclave to control an access controlled device: CH_AC_PROTECT_ENCRYPT, which is used by the enclave to get data from the device when in unblocked state 320, encrypted with a session key; CH_AC_PROTECT_BLOCK, which is used by the enclave to put the device to blocked state 310 (e.g., once the enclave is done using the device); and CH_AC_REPROGRAM, which is used by the enclave to reprogram the key associated with a device.

Figure 4:
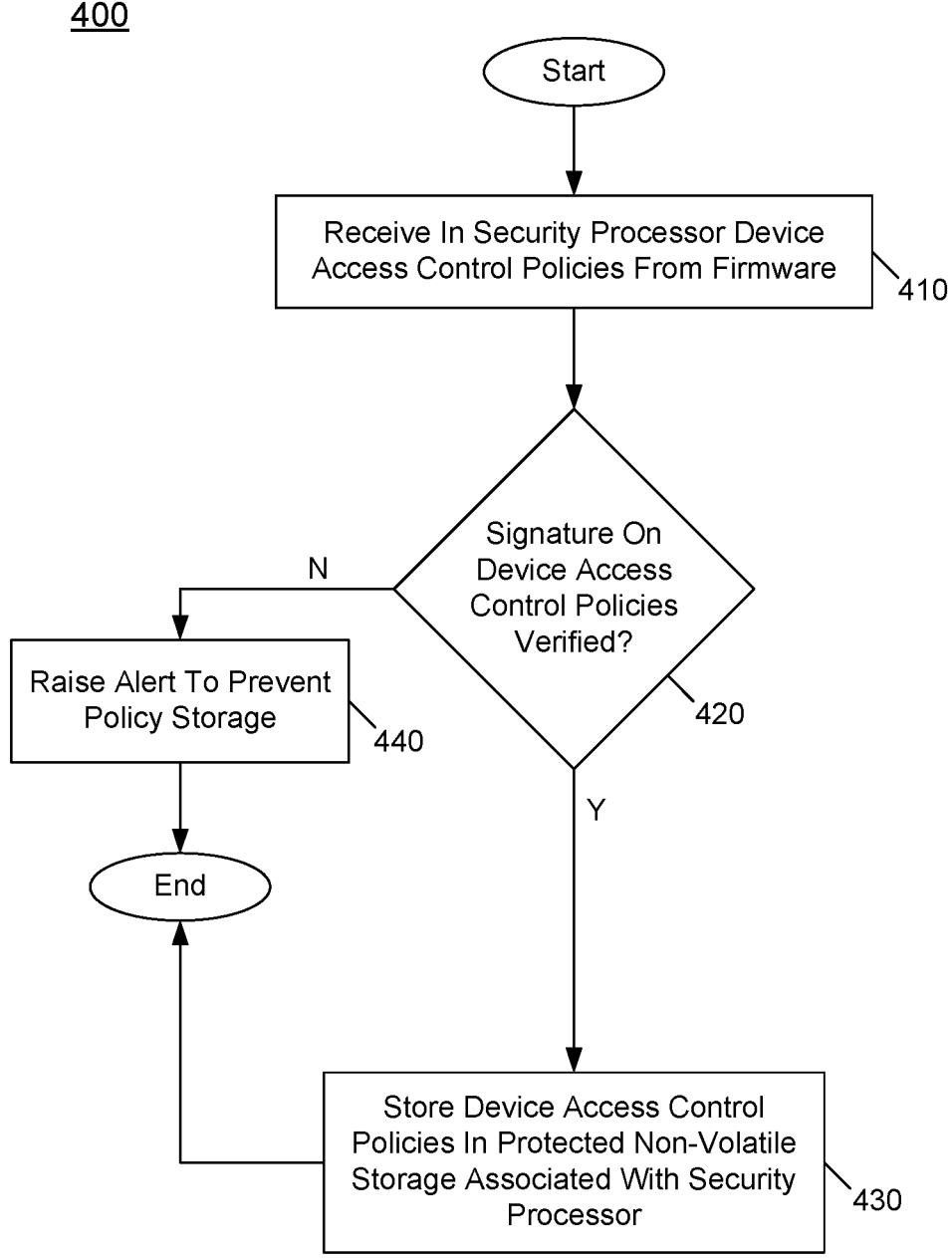
FIG. 4 is a flow diagram of a method in accordance with an embodiment of the present invention.

Referring now to FIG. 4, shown is a flow diagram of a method in accordance with an embodiment of the present invention. As shown in FIG. 4, method 400 is a method for securely storing device access control policies into a non-volatile storage of a platform. In an embodiment, method 400 may be executed as a one-time operation to load device access control policies into the platform, e.g., on an initial boot up of the system. To this end, method 400 may be performed by hardware circuitry, software, firmware and/or combinations thereof. In a particular embodiment, method 400 may be implemented by execution of firmware that provides an ability for an administrator or other user to establish configuration policies so that particular device access control policies associated with particular protected devices of the platform can be stored.

As seen, method 400 begins by receiving, in a security processor of the platform, device access control policies from firmware (block 410). Note that the security processor may be a standalone security coprocessor of the platform, which may be implemented as a separate programmable processor, e.g., a microcontroller of an SoC. In other cases, a separate security processor that in turn couples to a general purpose processor or SoC can be used. These device access control policies set forth parameters under which data obtained from or to be provided to a protected device is to be handled within the platform. As examples the security parameters may include an indication of authorized accessors (e.g., particular authorized enclaves), encryption/decryption policies and so forth. Note that the firmware from which these device access control policies are received may be a BIOS, e.g., as formulated by a given OEM.

Still with reference to FIG. 4, control next passes to diamond 420 where it is determined whether a signature of the device access control policies is verified. For example, the device access control policies may be signed with a private key of the OEM. In this instance, the security processor may verify the signature using a public key of the OEM, e.g., as stored in the platform. If verification is not successful, no further processing occurs with regard to these device access control policies and they are prevented from being otherwise maintained within the platform (block 440). And as shown in FIG. 4, an alert may be issued to notify, e.g., an administrator as to the error in validation.

Instead when a successful verification occurs, control passes to block 430 where these device access control policies can be stored in a non-volatile storage. In embodiments, this non-volatile storage is a protected storage associated with the security processor. In different implementations, the storage may be included within the security processor itself or otherwise coupled to the security processor. In any event, the storage (or at least the portion storing these device access control policies) is protected from access to any entity other than the security processor. This protected storage is integrity and replay-protected, in an embodiment.

Understand while shown at this high level in the embodiment of FIG. 4, many variations and alternatives are possible.

On platform reset (in pre-boot environment), the security processor provisions the access control policies into the CID filter for enforcement. To do this, the security processor reads the policies from non-volatile memory and verifies their integrity. The security processor writes the CID of the protected device, e.g., a blocked device's DMA channel, and its corresponding policy (identity of authorized enclave) to a filter entry of the CID filter. Thereafter the security processor removes access for itself from a security policy register of the CID filter (until the next platform reset). In this way, any of the code running in the security processor after uploading the policy to the CF is not allowed to change the policies inside the CF, and thus minimizes the TCB inside the security processor.

Figure 5:
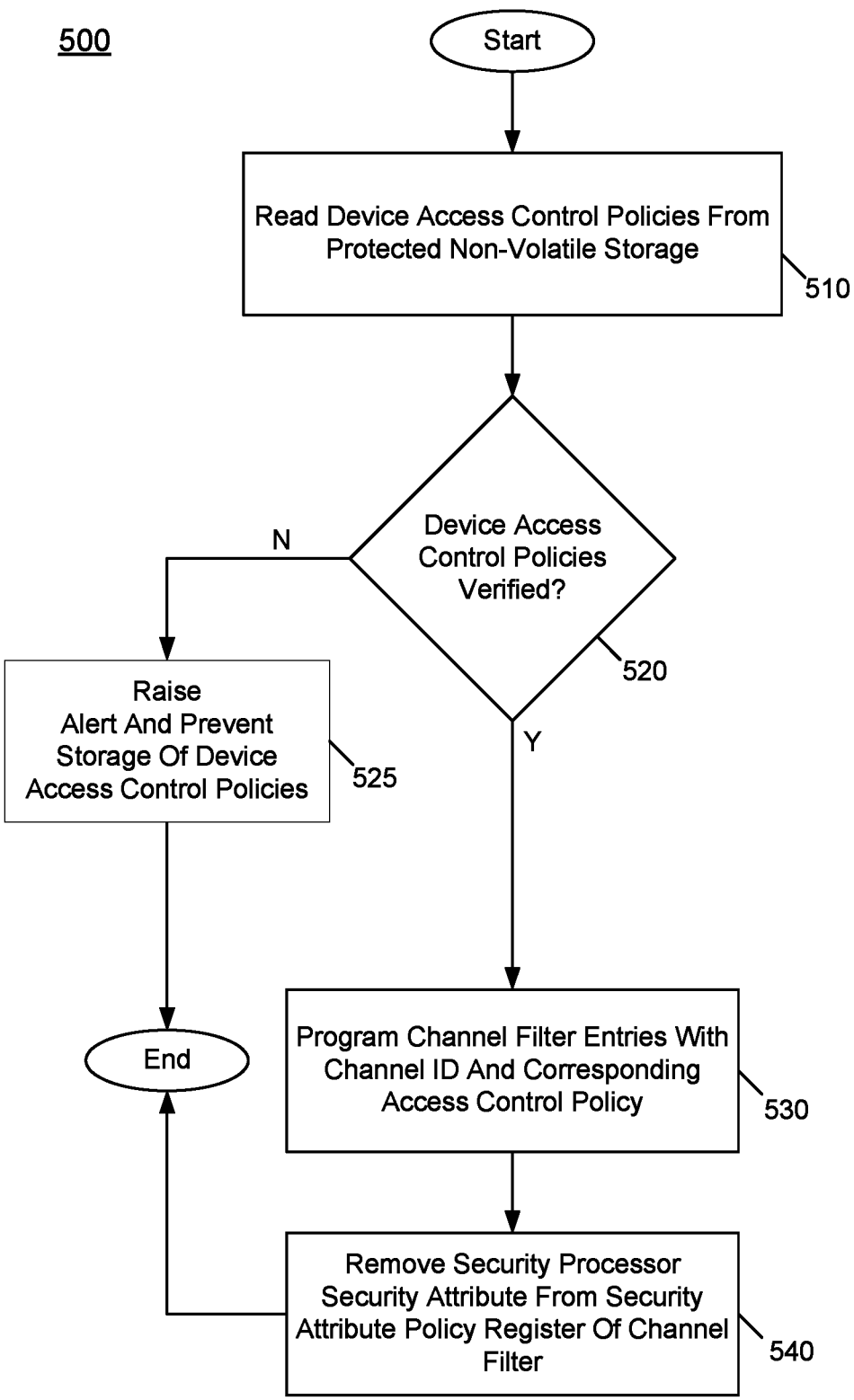
FIG. 5 is a flow diagram of a method in accordance with another embodiment.

Referring now to FIG. 5, shown is a flow diagram of a method in accordance with another embodiment. As shown in FIG. 5, method 500 is a method for provisioning device access control policies into a filter circuit. In embodiments herein, method 500 may be performed by hardware circuitry, software, firmware and/or combinations thereof. In a particular embodiment, method 500 may be implemented within a hardware filter circuit and/or a security coprocessor as described herein.

As illustrated, method 500 begins by reading device access control policies from the protected non-volatile storage (block 510). The security processor may read these policies from its associated protected storage. Next, the security processor may determine whether these device access control policies are verified (diamond 520). In an embodiment, the security processor can protect the policy by maintaining a cryptographic key for integrity protection in its hardware (e.g., in a fuse). The security processor also has a monotonic hardware counter. When it writes the policy to its non-volatile storage, it can integrity protect the policy with the cryptographic key and use the hardware counter value for replay protection. The cryptographic integrity protection algorithm generates a message authentication code (MAC) for the policy that is also stored, along with the policy. Whenever the policy is read from storage, the security processor uses the same key and counter value to compute the MAC. It then compares this value against the MAC value stored previously. If the two match, the policy was not modified in storage.

If not verified, the security processor may raise an alert that forces a user to handle the error or takes another action such as alerting a remote administrator (block 525). In any event, the policies are not stored to the filter storage.

Still with reference to FIG. 5, if the policies are verified, control next passes to block 530 where a programming operation may be performed. More specifically, at block 530 the security processor may program corresponding channel filter entries with given device access control policies, along with a channel ID. In one embodiment, each channel filter entry may include a field to store a channel identifier, which equates to a given protected device, various control information for interacting with the protected device, and an access control policy as described herein. Note that at this point, while a filter entry is allocated for each protected device and an access control policy and other information is stored, the entry is not active until a given authorized enclave seeks access to the protected device. As such at this point of provisioning, the channel filter entries are in a blocked state. As part of this blocked state, key information is not stored in the entries.

To ensure that no unauthorized entity can access the filter storage and modify the contents of any of the entries within the channel filter, next at block 540 security attribute information (SAI) may be removed from a security attribute policy register of the channel filter. SAI information of the security processor is stored in this security attribute policy register to enable the provisioning shown in FIG. 5. By removing this SAI information at a conclusion of the provisioning, no other entity is allowed to modify the contents of the entries within the channel filter during a given boot cycle, thus locking the device access control policies from unauthorized tampering. Understand while shown at this high level in the embodiment of FIG. 5, many variations and alternatives are possible.

Authorized software is assumed (for the purpose of this discussion) to run inside an SGX enclave. In an embodiment, the authorized enclave can unlock access to the device as follows: the enclave invokes a security instruction (EBIND) with the CID for the device channel and a session encryption key; execution of the EBIND generates a blob that includes the enclave's identity information (MR_SIGNER, PRODUCT_ID and SVN) from its control structure (note that the blob is encrypted with a wrapping key only known to microcode); the enclave sends the blob to the CF driver to execute the UNWRAP instruction with the EBIND blob; execution of the UNWRAP instruction decrypts the blob using the wrapping key, and verifies that the enclave's identity matches the policy programmed into the CID filter for the device by the security processor (during pre-boot). If the checks pass, an entry is updated in the CID filter with the encryption key; otherwise, an error is returned.

Note that the security processor is not involved in this unlocking operation, as both the EBIND and UNWRAP instructions are executed on the main processor (and more specifically where EBIND is executed by the enclave and UNWRAP is executed by the filter driver).

Figure 6:
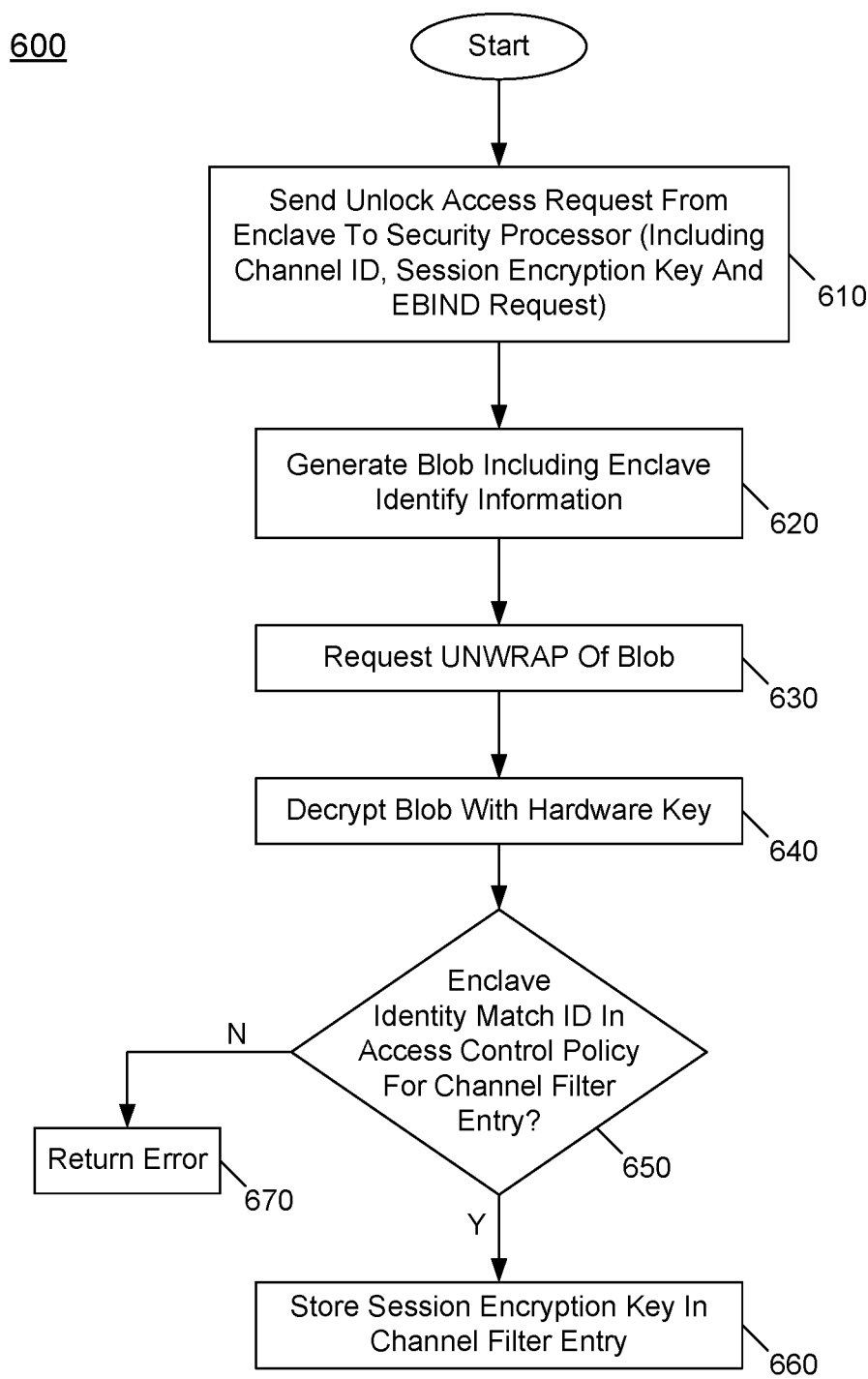
FIG. 6 is a flow diagram of a method in accordance with a still further embodiment of the present invention.

Referring now to FIG. 6, shown is a flow diagram of a method in accordance with a still further embodiment of the present invention. As shown in FIG. 6, method 600 is a method for unlocking access to a protected device, namely a device protected by a device access control policy in the channel filter. As such, method 600 is a method for unlocking a device access control policy provisioned in a filter circuit. In embodiments herein, method 600 may be performed by hardware circuitry, software, firmware and/or combinations thereof. In a particular embodiment, method 600 may be implemented within a hardware filter circuit and/or a security coprocessor as described herein.

As illustrated, method 600 begins by sending an unlock access request from an enclave to the security processor (block 610). Assume this enclave is an entity that seeks to access data from a protected device. For example, assume that the protected device is a fingerprint reader of a platform (and thus an input device), and the enclave is an authentication application that relies on fingerprint scanning information to perform user authentication. As illustrated at block 610, this unlock access request may include a channel ID, namely a channel ID for this protected device, a session encryption key, and an EBIND request. Note that the session encryption key is an encryption key that the enclave itself generates for use in encryption and decryption of data originating from the fingerprint scanner or other protected device. In an embodiment, the enclave itself may generate this ephemeral key, e.g., using a pseudo-random number generator or other entropy mechanism. In other situations, the enclave may use a hardware source of entropy via a CPU instruction, e.g., an x86 RDRAND instruction to obtain a random number for generating a key.

Still referring to FIG. 6, next at block 620 a binary large object (blob) may be generated that includes enclave identity information. In an embodiment, the security processor may generate this block. The input to the blob partly comes from the enclave. For example, the enclave submits the session key to the instruction, as well as the target for the blob. In this instance, the target is the channel filter. The behavior of UNWRAP depends on the target encoded in the blob. The EBIND instruction that generates the blob encrypts all the inputs from the enclave, in addition to extra information (e.g., identity of the requesting enclave), to generate the blob. The encryption key used to generate the blob is stored in microcode and accessed by the UNBIND instruction to decrypt the blob and perform the action depending on the target included in the blob.

Still with reference to FIG. 6, control next passes to block 630 where the security processor may request that an unwrap operation be performed on the blob. Note that this request may be sent to an untrusted portion of the SoC to perform this unwrap operation. As illustrated at block 640 the blob may be decrypted with a hardware key. Note that this hardware key is different than the session encryption key. Namely this hardware key is a key only known to microcode that executes the EBIND operation.

Still referring to FIG. 6, at diamond 650 it is determined whether the enclave identity matches the identity stored in the device access control policy for the channel filter entry. If not, an error is returned (block 670) and no unblocking of the channel filter entry occurs. Instead if it is determined that the IDs match, such that an authorized enclave is seeking access to the protected device, control passes to block 660 where the session encryption key is stored into the channel filter entry. At this point, the given entry of the channel filter is programmed and unblocked so that data from the protected device can be encrypted, stored in memory and otherwise accessed. Understand while shown at this high level in the embodiment of FIG. 6, many variations and alternatives are possible.

If the above process completes successfully, the authorized enclave can start accessing the encrypted data from the device's DMA channel using the programmed session encryption key. For input devices, the data is encrypted by hardware before it is accessible to software. Such encrypted data may be encrypted on the fly by a crypto engine using the session encryption key programmed by UNWRAP. For output devices, the data that is encrypted by the authorized software is decrypted by hardware before it is sent to the device.

Figure 7:
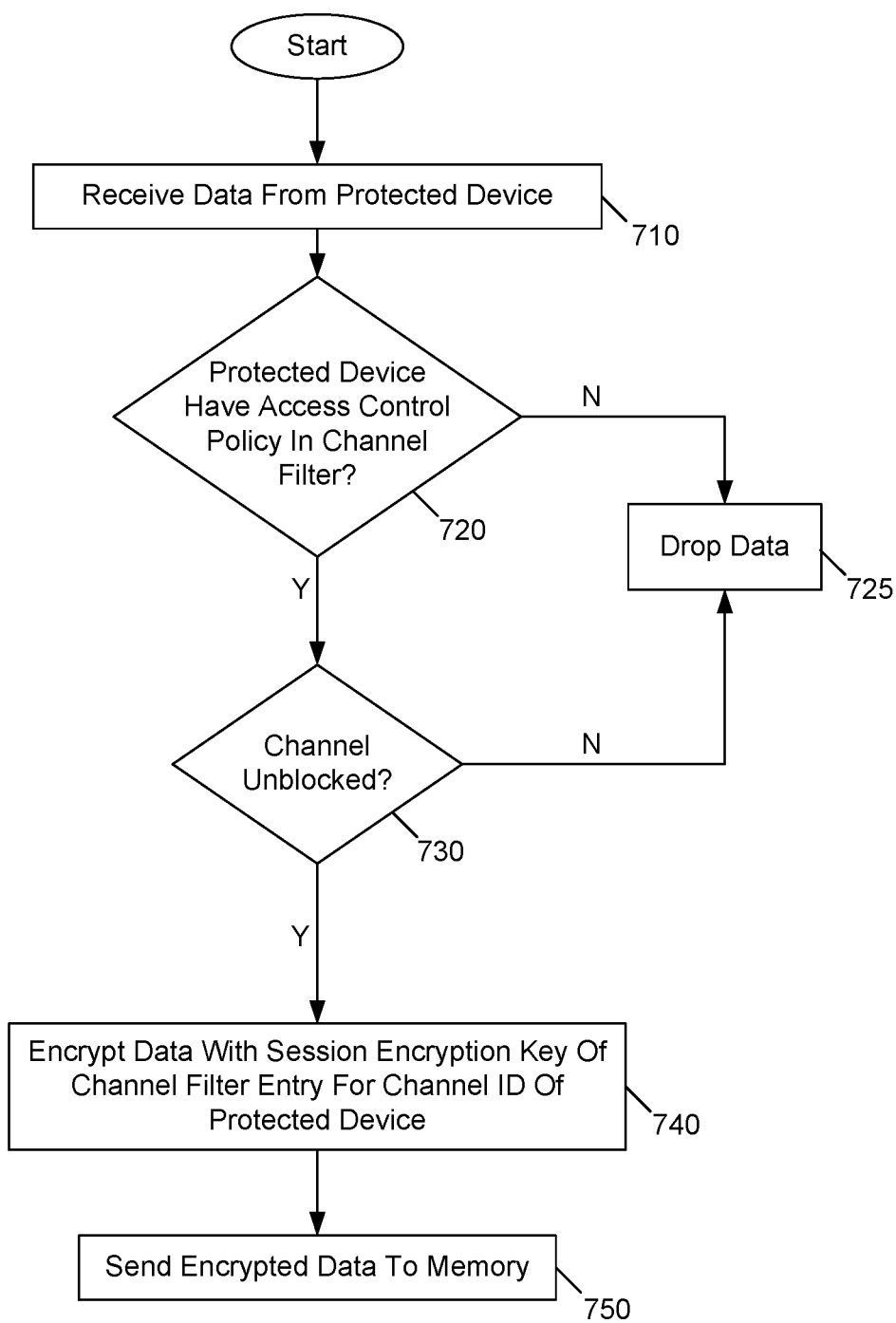
FIG. 7 is a flow diagram of a method in accordance with yet another embodiment of the present invention.

Referring now to FIG. 7, shown is a flow diagram of a method in accordance with yet another embodiment of the present invention. As shown in FIG. 7, method 700 is a method for processing incoming data from a protected device, namely an input device such as a fingerprint reader or other input device to receive protected information. In embodiments herein, method 700 may be performed by hardware circuitry, software, firmware and/or combinations thereof. In a particular embodiment, method 700 may be implemented within a hardware filter circuit and/or a security coprocessor as described herein.

Method 700 begins by receiving data from the protected device (block 710). Note that this data may be received within a memory encryption engine that is coupled between the protected device and a memory via a DMA channel. Assume that this incoming data is fingerprint data. The memory encryption engine is configured to access the channel filter storage to determine whether the protected device has a given access control policy stored in the channel filter (diamond 720). Note that this determination may be based upon a channel ID of the protected device, which may be used to access the entries in the filter storage, e.g., according to a CAM technique. If there is a stored access control policy, control passes to diamond 730 where it is determined whether the filter entry is unblocked. If the entry is determined to be unblocked, next at block 740 the data may be encrypted with the session encryption key of the channel filter entry for the channel ID of the protected device. Thereafter, this encrypted data is sent to the memory for storage (block 750). If it is determined that there is no entry for the device (or the entry is blocked), the data is dropped to prevent unauthorized access (block 725). Of course while shown with this particular implementation in the embodiment of FIG. 7, many variations and alternatives are possible.

Figure 8:
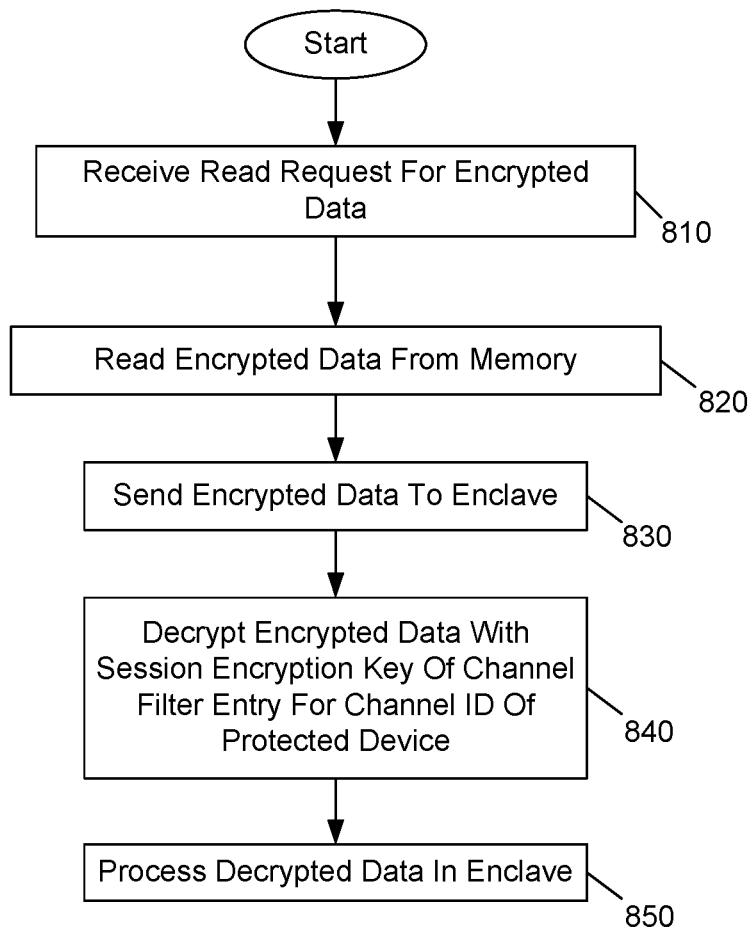
FIG. 8 is a flow diagram of a method in accordance with an additional embodiment of the present invention.

Referring now to FIG. 8, shown is a block diagram of a method in accordance with an additional embodiment of the present invention. As shown in FIG. 8, method 800 is a method for handling read requests for encrypted data. In embodiments herein, method 800 may be performed by hardware circuitry, software, firmware and/or combinations thereof. In a particular embodiment, method 800 may be implemented in part using a memory controller that interfaces with a memory.

Method 800 begins by receiving a read request for the encrypted data (block 810). This request may be received, e.g., in a memory controller that in turn includes or is coupled to a memory encryption engine. Assume that this request is from an enclave seeking to access the encrypted data.

Next at block 820 the encrypted data is read, e.g., via the memory controller and at block 830 the encrypted data is sent to the authorized enclave, which may decrypt the encrypted data with the session encryption key (block 840). Finally, at block 850 the decrypted data is processed in the requesting enclave, where it may be used, e.g., in furtherance of an authentication process. Of course while shown at this high level in the embodiment of FIG. 8, many variations and alternatives are possible.

After authorized software has completed using a device, the following operations are performed to lock access to the device: the enclave creates an unprogram request in an EBIND blob with the session encryption key used for accessing the data from the DMA channel; the enclave requests the CF driver to execute the UNWRAP instruction with the EBIND blob; and the UNWRAP instruction unprograms the channel from the CID filter and the device channel goes back to being blocked in the CID filter.

In embodiments, in order to manage an access controlled device, the enclave may be configured to furnish the device access control policy. The device access control policy includes the enclave identity and any enclave other than the authorized enclave trying to use the access controlled devices will not be able to furnish the policy and hence be blocked from using the device. The enclave populates a policy control structure which is used by the EBIND microcode to generate the policy. This policy control is provided as part of the input structure (BIND_STRUCT) to an EBIND instruction. The policy control structure allows the enclave to specify inclusion of one or more of the following fields in the policy: MR_SIGNER, ISVPRODID, ISVSVN, Include Supplied SVN instead of ISVSVN, Enclave ATTRIBUTES, Miscellaneous features.

All the fields above are included by the microcode (trusted) and not supplied by the calling enclave. This ensures that a malicious enclave cannot fake the identity of the authorized enclave. There is one exception to this general rule. The enclave is allowed to provide an SVN to be included instead of its current SVN. In order to allow later versions of the authorized enclave to be able to generate an unblocking policy provisioned using an older version of the enclave without having to re-provision the unblocking policy, the supplied SVN field is included. If the policy is set to include the supplied SVN instead of the SVN of the calling enclave, the microcode checks that the SVN of the calling enclave is greater than or equal to the SVN it is requesting to include. If so, the supplied SVN is used for generating the policy instead of the SVN of the calling enclave. Note that in the case where the SVN of the calling enclave is less than the SVN it is requesting to include, the generated policy will not include any SVN information.

As described above, an access controlled channel is programmed in the CF in the blocked state with an associated policy. The policy is used to represent ownership information for the channel and only an enclave that can furnish this information is allowed to unblock a channel. In order for an enclave to be able to unblock a channel, it generates the EBIND blob to include CH_AC_PROTECT_ENCRYPT as the command to indicate an access controlled channel unblocking attempt. Additionally, the calling enclave sets up a policy control bit vector correctly to generate the device access control policy. The enclave after generating the blob appropriately for unblocking, executes EBIND to obtain a wrapped blob. Based on the policy control bit vector, the EBIND flow generates the policy data. The wrapped blob is then handed over to the driver stack for programming the CID filter hardware, which executes UNWRAP to do the programming.

The UNWRAP flow on receiving an EBIND blob unwraps the blob and on a successful unwrap, proceeds to: check that the CID is in the CID filter hardware and matches the CID of an access controlled channel in the blocked state; check that the channel is not already in the encrypted state (which translates to the fact that the channel was unblocked previously by an authorized enclave); and match the policy received with EBIND with the policy programmed for the access controlled channel. The UNWRAP microcode can either read this from the CID filter on each programming attempt or it can read it during initialization and maintain it internally.

If all checks above pass, the unwrap flow proceeds to unblock the channel and protect it using encryption via the key included with the programming attempt. Similar to other flows, the access controlled device unblocking flow generates a cryptographic response for the calling enclave to determine the status of programming. This is done with the response key included in the EBIND blob. Table 1 below shows the various responses possible for an access controlled device unblocking flow in accordance with an embodiment.

TABLE 1

Programming Return Codes

| Programming Result | Status Code in Cryptographic Response |
| --- | --- |
| Channel Unblocking Successful | CH_PROG_SUCCESS |
| Channel ID not in use | CH_PROG_CID_UNAVAILABLE |

TABLE 1-continued

| Programming Return Codes | |
|---|---|
| Programming Result | Status Code in Cryptographic Response |
| Channel already programmed to encrypted | CH_ALREADY_PROG |
| Channel policy mismatch | CH_PROG_POLICY_MISMATCH |

An access controlled device blocking flow allows an authorized enclave to put an access controlled device to its original blocked state, where all data originating from this device is blocked from reaching memory. This is done by creating an EBIND blob with CH_AC_PROTECT_BLOCK. After constructing the EBIND blob, the enclave calls EBIND with the blob passed as a parameter. EBIND generates a wrapped version of the blob which is passed to the untrusted software to be programmed to the CID filter which executes UNWRAP to do the programming.

The UNWRAP flow on receiving an EBIND blob unwraps the blob and on a successful unwrap proceeds to: check if the channel ID is in use; check that the device is not already in the blocked state; match the policy received with EBIND with the policy programmed for the access controlled channel; and check that the device key with the programming attempt matches the current device key. If the above checks pass, unwrap proceeds to block the channel. To this end, the microcode updates the CID filter hardware entry corresponding to the device to indicate that the device is blocked, and subsequent transactions originating from the device will be dropped.

Table 2 shows the response codes for a blocking attempt in accordance with an embodiment.

TABLE 2

| Programming Return Codes | |
|---|---|
| Programming Result | Status Code in Cryptographic Response |
| Channel Unblocking Successful | CH_PROG_SUCCESS |
| Channel ID not in use | CH_PROG_CID_UNAVAILABLE |
| Channel already programmed to encrypted | CH_ALREADY_PROG |
| Channel policy mismatch | CH_PROG_POLICY_MISMATCH |

The enclave might need to re-program the channel key associated with a channel for usages such as response to integrity errors. In order to reprogram the key associated with a channel, the enclave generates a new channel key and provides the current (or old) channel key in the EBIND blob to allow the unwrap flow to establish channel ownership and allow only the enclave that programmed the channel to re-program it. In addition to the old channel key, the blocking policy is also furnished and hence the enclave sets the access controlled policy fields appropriately. The command field is set to reprogram the channel key, CH_AC_REPROGRAM.

The enclave, after generating the blob appropriately for reprogramming, executes EBIND to obtain a wrapped blob. The wrapped blob is handed over to untrusted software which executes the UNWRAP to do the re-programming. If the channel is currently programmed, the current key passed in EBIND blob is compared with the current channel key. In addition to comparing the key, the policy furnished is compared with the policy associated with the channel as well. This is done to establish channel ownership as only the owner enclave can provide the old channel key and unblocking policy. If the unwrapping and checks pass, the microcode updates the channel key associated with the channel using the new key received with the EBIND blob. The microcode flow then proceeds to generate a cryptographic response using the response key recovered from the BIND_STRUCT.

The following examples pertain to further embodiments.

In one example, an apparatus includes: a memory encryption circuit to encrypt data from a protected device, the data to be stored to a memory; and a filter circuit coupled to the memory encryption circuit, the filter circuit including a plurality of filter entries, each filter entry to store a channel ID corresponding to a protected device, an access control policy for the protected device, and a session encryption key provided by an enclave, the enclave permitted to access the data according to the access control policy, where the filter circuit is to receive the session encryption key from the enclave in response to validation of the enclave.

In an example, the apparatus further comprises a security processor coupled to the filter circuit, the security processor, on an initial boot of a platform, to receive a first plurality of access control policies from firmware and store the first plurality of access control policies in a protected storage and thereafter lock the protected storage, the protected storage to be protected with integrity protection and replay protection.

In an example, the apparatus comprises a system on chip having a plurality of cores, the security processor and the filter circuit.

In an example, on a reset of the platform, the security processor is to load the plurality of access control policies from the protected storage to the filter circuit in response to validation of the plurality of access control policies, and thereafter prevent modification to the plurality of access control policies during a boot cycle.

In an example, the plurality of access control policies comprises a subset of the first plurality of access control policies, wherein in response to user configuration, the security processor is to select the subset of the first plurality of access control policies, each of the subset of the first plurality of access control policies associated with a protected device present in the platform.

In an example, the filter circuit is to unlock a first filter entry in response to a request from a first enclave, the first filter entry to store a first access control policy for a first protected device, and in response to validation of the first enclave, the filter circuit is to store in the first filter entry a first session encryption key received from the first enclave.

In an example, the memory encryption circuit is to encrypt first data from the first protected device with the first session encryption key and cause the encrypted first data to be stored in the memory.

In an example, the apparatus further comprises a memory controller to receive a read request from the first enclave for the encrypted first data and send the encrypted first data to the first enclave, where the first enclave is to decrypt the encrypted first data with the first session encryption key.

In an example, the filter circuit is to receive a lock request from the first enclave, and in response to the lock request, cause the first filter entry to be blocked, where the filter circuit is to remove the first session encryption key from the first filter entry to block the first filter entry.

In an example, the filter circuit is to drop second data received from the first protected device when the first filter entry is blocked.

In an example, the filter circuit is to send second data from a second device to the memory without encryption when the second device does not have an associated access control policy stored in a filter entry of the filter circuit.

In another example, a method comprises: receiving, in a security processor of a platform, a plurality of device access control policies from a protected non-volatile storage of the platform; in response to determining that the plurality of device access control policies are verified, programming a channel filter with a plurality of entries each associated with one of the plurality of device access control policies; and removing a security attribute of the security processor from a policy register of the channel filter, to lock the channel filter for a boot cycle of the platform.

In an example, the method further comprises in response to a first request from a first enclave, unblocking a first filter entry and storing a first session encryption key in the first filter entry, to enable the first enclave to access data from a first device associated with the first filter entry.

In an example, the method further comprises: receiving first data from the first device; identifying a first access control policy in the first filter entry and encrypting the first data with the first session encryption key stored in the first filter entry; and sending the first encrypted data to a memory for storage.

In an example, the method further comprises: in response to a read request for the first encrypted data from the first enclave, obtaining the first encrypted data from the memory; and sending the first encrypted data to the first enclave, where the first enclave is to decrypt the first encrypted data with the first session encryption key.

In an example, the method further comprises: in response to an access request to the first device from a second enclave; determining whether the second enclave is identified in the first access control policy; and in response to determining that the second enclave is not identified in the first access control policy, preventing the second enclave from access to the first device.

In an example, the method further comprises: receiving, in the security processor, the plurality of device access control policies from a firmware of the platform, on an initial boot of the platform; and storing the plurality of device access control policies in the protected non-volatile storage, in response to verification of the plurality of device access control policies.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a first device to receive data from a user and send the data to a destination; a memory to store the data from the first device; and a system on chip. The system on chip comprises: at least one core; a security processor coupled to the at least one core; a memory execution circuit coupled between the first device and the memory; and a filter to store a plurality of device access control policies including a first device access control policy for the first device, the first device access control policy comprising a first identifier to identify the first device, a second identifier to identify an authorized accessor of the data, and a first encryption key provided by the authorized accessor, where the filter is to prevent other accessors from access to the data, and when the first encryption key is not present, to prevent the authorized accessor from access to the data from the first device.

In an example, the security processor, on an initial boot of the system, is to receive a first plurality of device access control policies from firmware and store the first plurality of device access control policies in a protected storage and thereafter lock the protected storage, where the plurality of device access control policies comprises a subset of the first plurality of device access control policies.

In an example, the filter is to unlock the first device access control policy in response to a request from a first enclave, and in response to validation of the first enclave, the filter is to store the first encryption key received from the first enclave in the first device access control policy, and the memory execution circuit is to encrypt first data from the first device with the first encryption key prior to storage in the memory.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a memory encryption circuit to encrypt data from a protected device, the data to be stored to a memory; and
a filter circuit coupled to the memory encryption circuit, the filter circuit including a plurality of filter entries, each filter entry to store a channel identifier (ID) corresponding to a protected device, an access control policy for the protected device, and a session encryption key provided by an enclave, the enclave permitted to access the data according to the access control policy, wherein the filter circuit is to receive the session encryption key from the enclave in response to validation of the enclave,
wherein responsive to receipt of first data and a first channel ID corresponding to a first device, the memory encryption circuit is to:
access the filter circuit to determine whether a first filter entry of the plurality of filter entries stored at the filter circuit includes a first access control policy associated with the first channel ID, and
encrypt the first data using a first session encryption key in the first filter entry based on the determination.

2. The apparatus of claim 1, further comprising a security processor coupled to the filter circuit, the security processor, on an initial boot of a platform, to receive a first plurality of access control policies from firmware and store the first plurality of access control policies in a protected storage and thereafter lock the protected storage, the protected storage to be protected with integrity protection and replay protection.

3. The apparatus of claim 2, wherein the apparatus comprises a system on chip having a plurality of cores, the security processor and the filter circuit.

4. The apparatus of claim 2, wherein on a reset of the platform, the security processor is to load the first plurality of access control policies from the protected storage to the filter circuit in response to validation of the first plurality of access control policies, and thereafter prevent modification to the first plurality of access control policies during a boot cycle.

5. The apparatus of claim 2, wherein a second plurality of access control policies comprises a subset of the first plurality of access control policies, wherein in response to user configuration, the security processor is to select the subset of the first plurality of access control policies, each of the subset of the first plurality of access control policies associated with a protected device present in the platform.

6. The apparatus of claim 1, wherein the filter circuit is to unlock the first filter entry in response to a request from a first enclave, the first filter entry to store the first access control policy for a first protected device, and in response to validation of the first enclave, the filter circuit is to store in the first filter entry the first session encryption key received from the first enclave.

7. The apparatus of claim 6, wherein the memory encryption circuit is to encrypt the first data from the first protected device with the first session encryption key and cause the encrypted first data to be stored in the memory.

8. The apparatus of claim 7, further comprising a memory controller to receive a read request from the first enclave for the encrypted first data and send the encrypted first data to the first enclave, wherein the first enclave is to decrypt the encrypted first data with the first session encryption key.

9. The apparatus of claim 1, wherein the filter circuit is to receive a lock request from a first enclave, and in response to the lock request, cause the first filter entry of the plurality of filter entries to be blocked, wherein the filter circuit is to remove the first session encryption key from the first filter entry to block the first filter entry.

10. The apparatus of claim 9, wherein the filter circuit is to drop second data received from the first device when the first filter entry is blocked.

11. The apparatus of claim 1, wherein the filter circuit is to send second data from a second device to the memory without encryption when the second device does not have an associated access control policy stored in a filter entry of the filter circuit.

12. A system comprising:
a first device to receive data from a user and send the data to a destination;
a memory to store the data from the first device; and
a system on chip comprising:
at least one core;
a security processor coupled to the at least one core;
a memory encryption circuit coupled between the first device and the memory; and
a filter circuit including a plurality of filter entries, each of the plurality of filter entries to store a channel identifier (ID) corresponding to a protected device, a device access control policy for the protected device, and a session encryption key provided by an enclave, the enclave permitted to access the data according to the device access control policy, wherein the filter circuit is to receive the session encryption key from the enclave in response to validation of the enclave,
wherein responsive to receipt of the data from the first device and a first channel ID corresponding to the first device, the memory encryption circuit is to:
access the filter circuit to determine whether a first filter entry of the plurality of filter entries stored at the filter circuit includes a first access control policy associated with the first channel ID, and
encrypt the data using a first session encryption key in the first filter entry based on the determination.

13. The system of claim 12, wherein the security processor, on an initial boot of the system, is to receive a first plurality of device access control policies from firmware and store the first plurality of device access control policies in a protected storage and thereafter lock the protected storage, wherein the plurality of device access control policies comprises a subset of a first plurality of device access control policies to be stored in the plurality of filter entries.

14. The system of claim 12, wherein the filter circuit is to unlock the first device access control policy in response to a request from a first enclave, and in response to the validation of the first enclave, the filter circuit is to store the first session encryption key received from the first enclave in the first device access control policy, and the memory execution circuit is to encrypt first data from a first protected device with the first session encryption key prior to storage in the memory.

* * * * *